May 4, 1948. H. L. ANDERSON 2,440,999
COMPRESSED NEUTRON SOURCE
Filed July 1, 1943

Herbert L. Anderson INVENTOR.

BY

Patented May 4, 1948

2,440,999

UNITED STATES PATENT OFFICE 2,440,999

COMPRESSED NEUTRON SOURCE

Herbert L. Anderson, Chicago, Ill., assignor to the United States of America, as represented by the United States Atomic Energy Commission Application July 1, 1943, Serial No. 493,126

18 Claims. (Cl. 250—84)

The invention relates to a neutron source and more particularly relates to a high intensity neutron source in a compressed form.

In many cases where neutron emission is involved, it is advantageous to have an intense and effective neutron source which occupies so small a volume as to approximate the desired condition of the neutrons originating from a source existing at only one point. Where a minute amount of a conventional neutron emitting mixture is used, the desired condition of a point source is obtained but only at the sacrifice of the intensity of the neutron emission. Conversely, where sufficient quantity of the neutron emitting mixture to give the desired intensity is used, the volume occupied by such mixture is so large that the condition of point source is not obtained. In either case, it is difficult or impossible to use the conventional neutron emitting mixture for many purposes, as in making accurate measurements or obtaining other experimental data. Furthermore, where the neutron emitting material, the radioactive substance, or the decay products of the radioactive substance, e. g., radon or its decay products, change their positions in the source, the intensity of the neutron source has a tendency to vary as such changes of positions occur. It has now been discovered that the neutron emitting mixture may be compressed to permanently fix the positions of the components in the mixture and to greatly decrease its volume without decreasing the intensity or effectiveness of the source. It is an object of the invention to provide a neutron source which gives a constant and intense neutron emission and at the same time approximates the desired point condition.

Figure 1:
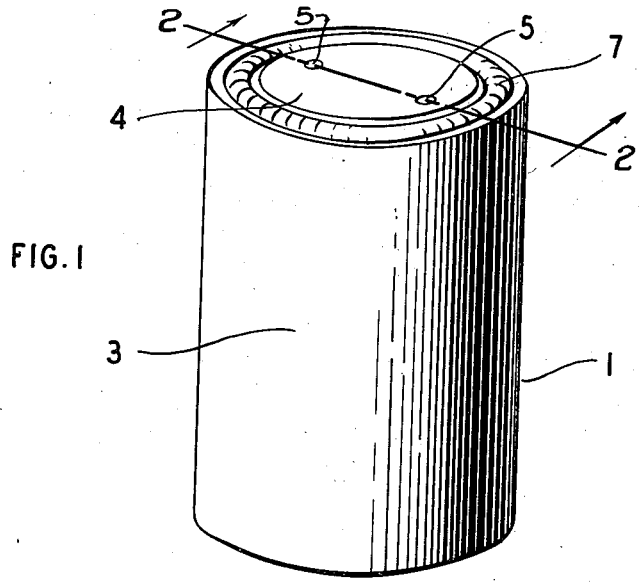
Figure 2:
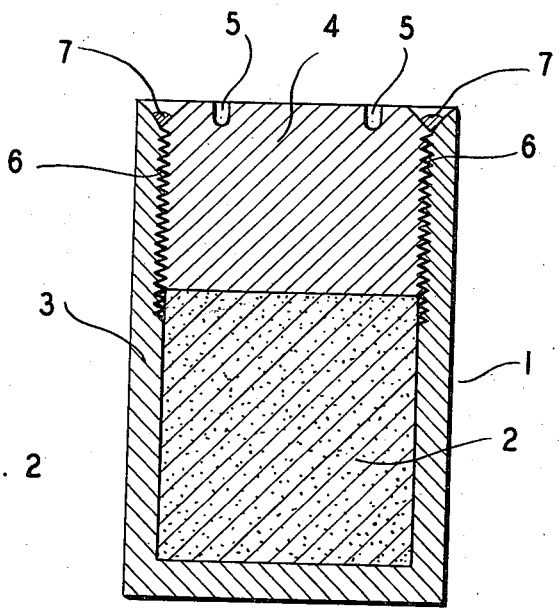

In the drawing, Fig. 1 is a perspective view of one embodiment of the invention, and Fig. 2 is a sectional view taken on line 2—2 of Fig. 1.

Briefly, the invention comprises mixing a radioactive substance, such as radium either in elemental form or as a compound, with a neutron emitting material, such as beryllium metal, so that the rays emitted from the radioactive substance upon striking the beryllium metal will cause one or more neutrons to be emitted from the latter material. The mixture is subjected to considerable pressure to form a pellet of the desired shape and size which is tightly enclosed in a metallic container.

The neutron emission results mainly from the bombardment of alpha rays from the radioactive substance on the neutron-emitting material. Where beryllium metal is used, the main reaction in the mixed neutron source is:

Secondary effects resulting from bombardment of the beryllium by gamma rays to give neutrons and alpha rays may contribute to the neutron emission, as follows:

The alpha rays resulting from the secondary effect may in turn produce neutrons according to the main reaction.

The radioactive substance is considered to be any element or compound giving off sufficient alpha rays for the main reaction or gamma rays for the secondary effect, or both. Thorium or mesothorium may be used although it has been found that radium is particularly suitable for this purpose. The neutron emitting material, i. e., a material which will give off neutrons when bombarded with alpha rays, gamma rays, or both, is preferably beryllium metal, although lithium and boron give a similar effect. Where radium bromide and beryllium are used, the neutron emitting mixture may consist of approximately one part of radioactive substance to three parts of the neutron emitting material. The neutron emitting material is pulverized to a convenient particle size, such as 300 mesh, and mixed with the radioactive substance so that the latter is uniformly distributed throughout the neutron emitting material. It has been found that better results are obtained where the components are finely divided so as to have a large surface area.

The mixture is subjected to considerable pressure in any conventional press device to form a pellet. As compression of the mixture does not decrease its neutron emitting characteristics, any convenient pressure which is sufficient to greatly compact the mixture may be used. The amount of pressure applied is limited only by the volume of the neutron source permitted with respect to the intensity desired. It has been found that pressures in excess of 20,000 pounds per square inch are satisfactory.

It is preferred that the pellet be compressed to a shape and size which will have the least surface area. In this way, the greatest amount of the neutron emitting mixture can be utilized under the smallest point source conditions. Where the pellet is to be enclosed in a protecting metallic container, it has been found that the most convenient shape for the pellet is that of a cylinder in which the length is approximately equivalent to that of the diameter, as shown in Figs. 1 and 2.

To protect the pellet of neutron emitting mixture and to prevent leakage of radon which is formed by the decay of the radium or radium compound, it is desirable to tightly enclose the pellet in a metallic container. Any metal, such as brass, copper, or the like, which will have sufficient strength to properly protect the pellet and to retain the radon within the container may be used. The neutrons emitted from the mixture have sufficiently high penetrating characteristics to pass through conventional wall thicknesses of a container formed from the above metals.

In the preferred embodiment of the invention as shown in the drawing, the neutron source 1 is made by mixing 205.5 mg. of radium bromide with 600 mg. of beryllium metal powder. The radium bromide is dissolved in warm water and the solution boiled until the radioactive decay products from the radium have been volatilized. The beryllium powder, pulverized to 300 mesh, is added to the radium bromide solution. The water is evaporated so that the radium bromide is deposited on the beryllium particles. The mixture is subjected to a pressure of approximately 20,000 pounds per square inch in a conventional press device to form a cylindrical pellet 2 having a diameter of .81 cm. and a height of .83 cm. The pellet is placed in a brass container 3 having an outer diameter of 1.1 cm. and a height of 1.7 cm., the pellet fitting snugly within. The upper portion of the inner surface of the container is threaded to receive cap 4, which is turned by any conventional driver device fitting into holes 5.

Where the container is securely sealed, the radon, resulting from the radium decay, and its solid decay products maintain a constant rate of decay, as does the radium. Eventually, an equilibrium is reached which causes the pellet 2 to provide a substantially constant and steady source of neutrons. It is important to prevent leakage of radon from container 3; otherwise, the equilibrium will be upset and the neutron source will be inconstant. Also, radon escaping from the container would contaminate the air and surrounding surfaces, thus providing a dangerous source of radioactivity. To prevent leakage of the radon, the threads on the container 3 and cap 4 may be tinned with solder before the cap is screwed into the container and the neutron source heated after the cap is in place to cause the solder to flow and form a metallic seal 6 between the cap and container. To further insure against leakage, a solder seal 7 may be placed over the cap as indicated in Figs. 1 and 2.

To further cause the neutron source to approximate a point source condition, the amount of neutron emitting mixture used for the neutron source may be lowered until the compressed mixture reaches the permitted volume. The conventional manner of decreasing the volume of the neutron source is to merely use lesser amounts of the neutron emitting mixture, thereby lowering the intensity in direct ratio. It has now been found that less of the mixture may be used without proportionately lowering the intensity. This is done by decreasing, within limits, the amount of beryllium used in proportion to the amount of radium bromide used. Thus, a source made by mixing one gram of radium as radium bromide with ten grams of beryllium, but not compressed, had a volume of 18 cm.$^3$ and gave $13 \times 10^6$ neutrons per second. A second source containing one gram of radium as radium bromide mixed with three grams of beryllium and compressed into a pellet of volume 2.25 cm.$^3$ gave $9.64 \times 10^6$ neutrons per second. By compressing the mixture and reducing the amount of beryllium there was obtained a reduction in volume by a factor of 8 while at the same time the neutron output of the compressed mixture was but 25 per cent less than that of the uncompressed product despite the substantial reduction of beryllium.

If desired, the neutron source may be surrounded with a metal such as lead with sufficient wall thickness to prevent or reduce the emission of gamma rays while permitting the passage of neutrons therethrough. Where this type of container is used, the neutrons emitted will have energy characteristics different from those of neutrons passing through the container described in the preferred embodiment of the invention.

The above detailed description is given for purposes of illustration and the invention is to be limited only by the scope of the appended claims.

I claim:

1. A neutron source comprising a compressed mixture of a radioactive substance and a material capable of emitting neutrons when exposed to the radioactivity of said substance, said mixture being compressed to a degree to increase the neutron density therein.

2. A neutron source comprising a dense pellet formed of a mixture of a radioactive substance and a material capable of emitting neutrons when exposed to the radioactivity of said substance, said pellet being compressed to a degree to increase the neutron density therein.

3. A small, intense neutron source comprising a compressed mixture of an alpha ray emitting substance and a material that will emit a neutron when struck by rays from said substance, said mixture being compressed to a degree to increase the neutron density therein.

4. A neutron source comprising a compressed mixture of radium and a material capable of emitting neutrons when exposed to the radioactivity of radium, said mixture being compressed to a degree to increase the neutron density therein.

5. A neutron source comprising a compressed mixture of a radioactive substance and beryllium, said mixture being compressed to a degree to increase the neutron density therein.

6. A neutron source comprising a compressed mixture of radium and beryllium, said mixture being compressed to a degree to increase the neutron density therein.

7. A neutron source comprising a compressed mixture of radium and beryllium in a sealed container, said mixture being compressed to a degree to increase the neutron density therein.

8. A neutron source comprising a compressed pellet enclosed in a metallic container, said pellet comprising a mixture of a radioactive substance and a material capable of emitting neutrons when exposed to the radioactivity of said substance, said pellet being compressed to a degree to increase the neutron density therein.

9. A neutron source comprising a compressed mixture of a radioactive substance and a material capable of emitting neutrons when exposed to the radioactivity of said substance, said mixture being sealed in a container adapted to prevent the leakage of radon therefrom, said mixture being compressed to a degree to increase the neutron density therein.

10. A neutron source comprising a compressed mixture of a radioactive substance and a material capable of emitting neutrons when exposed to the radioactivity of said substance enclosed in a metallic container, said mixture being compressed to a degree to increase the neutron density therein, said container having a receptacle portion containing said mixture, a cap portion engaging said receptacle portion, and a metal seal between the engaging surfaces of said receptacle portion and said cap portion.

11. A neutron source comprising a dense, cylindrical pellet formed of a mixture of a radioactive substance and a material capable of emitting neutrons when exposed to the radioactivity of said substance, the length of said pellet being substantially equivalent to its diameter, said pellet being compressed to a degree to increase the neutron density therein.

12. A neutron source comprising compressed particles of a material capable of emitting neutrons when exposed to radioactivity, said particles having a radioactive substance associated therewith, said particles being compressed to a degree to increase the neutron density therein.

13. A neutron source comprising compressed particles of beryllium, said particles having radium bromide deposited thereon, said particles being compressed to a degree to increase the neutron density therein.

14. A neutron source comprising a compressed neutron emitting mixture, said mixture comprising a substantial quantity not more than approximately three parts of material capable of emitting neutrons when exposed to radioactivity, by weight, to one part, by weight, of radioactive substance, said mixture being compressed to a degree to increase the neutron density therein.

15. A neutron source comprising a compressed neutron emitting mixture, said mixture comprising between one and ten parts, by weight, of material capable of emitting neutrons when exposed to radioactivity to one part, by weight, of radioactive substance, said mixture being compressed to a degree to increase the neutron density therein.

16. A neutron source comprising a compressed neutron emitting mixture, said mixture comprising between one and ten parts, by weight, of beryllium to one part, by weight, of radium bromide, said mixture being compressed to a degree to increase the neutron density therein.

17. A neutron source comprising a compressed neutron emitting mixture, said mixture comprising a substantial amount not in excess of approximately three parts, by weight, of beryllium to one part, by weight, of radium bromide.

18. A neutron source comprising an alpha ray emitting substance mixed with a substance which yields neutrons under alpha bombardment, said mixture having been compacted under a pressure of sufficient magnitude, that the rate of neutron output per unit weight of neutron emitter in the compacted mixture is greater than the rate of neutron output per unit weight of neutron emitter in an uncompacted mixture.

HERBERT L. ANDERSON.

REFERENCES CITED

The following references are of record in the file of this patent:

UNITED STATES PATENTS

| Number | Name | Date |
|---|---|---|
| 1,152,083 | Fenderl | Aug. 31, 1915 |
| 2,220,509 | Brons | Nov. 5, 1940 |
| 2,269,458 | Kahn | Jan. 13, 1942 |
| 2,285,440 | Kaiser | June 9, 1942 |
| 2,326,631 | Fischer | Aug. 10, 1943 |